(12) United States Patent
Scholl et al.

(10) Patent No.: US 9,304,800 B1
(45) Date of Patent: Apr. 5, 2016

(54) USING VIRTUAL PROVISIONING MACHINES TO PROVISION DEVICES

(75) Inventors: Thomas Bradley Scholl, Seattle, WA (US); Eric Jason Brandwine, Haymarket, VA (US); Zachary J. Hansen, Seattle, WA (US); Richard M. Lotz, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 597 days.

(21) Appl. No.: 13/535,496

(22) Filed: Jun. 28, 2012

(51) Int. Cl.
 *G06F 9/455* (2006.01)
 *G06F 9/50* (2006.01)

(52) U.S. Cl.
 CPC .......... *G06F 9/45537* (2013.01); *G06F 9/5077* (2013.01)

(58) Field of Classification Search
 USPC .......................................................... 718/1
 See application file for complete search history.

(56) References Cited

U.S. PATENT DOCUMENTS

| | | | |
|---|---|---|---|
| 8,406,682 B2 * | 3/2013 | Elesseily et al. | 434/362 |
| 8,595,378 B1 * | 11/2013 | Cohn | H04L 65/4076 709/238 |
| 8,635,395 B2 * | 1/2014 | Colbert | 711/6 |
| 2008/0222375 A1 * | 9/2008 | Kotsovinos et al. | 711/162 |
| 2008/0240122 A1 * | 10/2008 | Richardson | H04L 12/4641 370/401 |
| 2010/0095297 A1 * | 4/2010 | Sethi et al. | 718/1 |
| 2010/0191545 A1 * | 7/2010 | Heinert et al. | 705/3 |
| 2011/0022694 A1 * | 1/2011 | Dalal et al. | 709/222 |
| 2011/0066879 A1 * | 3/2011 | Nakai | 714/6.2 |
| 2011/0265084 A1 * | 10/2011 | Knowles et al. | 718/1 |
| 2011/0307596 A1 * | 12/2011 | Kaneko et al. | 709/223 |
| 2012/0066681 A1 * | 3/2012 | Levy et al. | 718/1 |
| 2012/0110574 A1 * | 5/2012 | Kumar | 718/1 |
| 2012/0204173 A1 * | 8/2012 | Liu | 718/1 |
| 2012/0266168 A1 * | 10/2012 | Spivak et al. | 718/1 |

* cited by examiner

*Primary Examiner* — Jason Mitchell
*Assistant Examiner* — Kevin X Lu
(74) *Attorney, Agent, or Firm* — Sutherland Asbill & Brennan LLP

(57) ABSTRACT

Systems and methods are disclosed for establishing a connection between a provisioning environment having one or more virtual provisioning machines associated therewith and a set of devices located remotely from the provisioning environment, and for facilitating establishment of a provisioned state for the set of remote devices based at least in part on a provisioning state associated with the virtual provisioning machines.

29 Claims, 6 Drawing Sheets

USING VIRTUAL PROVISIONING MACHINES TO PROVISION DEVICES

BACKGROUND

The build-out of a facility generally entails provisioning devices located at the facility by configuring the devices and installing operating system and application software on the devices. A conventional means for performing a facility build includes manually configuring host devices and network devices at the facility and manually loading the appropriate software on the devices from physical media physically transported to the facility. However, this is a cumbersome approach.

BRIEF DESCRIPTION OF THE DRAWINGS

The detailed description is set forth with reference to the accompanying drawings. In the drawings, the left-most digit(s) of a reference numeral identifies the drawing in which the reference numeral first appears. The use of the same reference numeral(s) indicates similar or identical items. Various embodiments may utilize elements and/or components other than those illustrated in the drawings, and some elements and/or components may not be present in various embodiments. Use of plural terminology includes the singular and vice versa.

DETAILED DESCRIPTION

Overview

Figure 1:
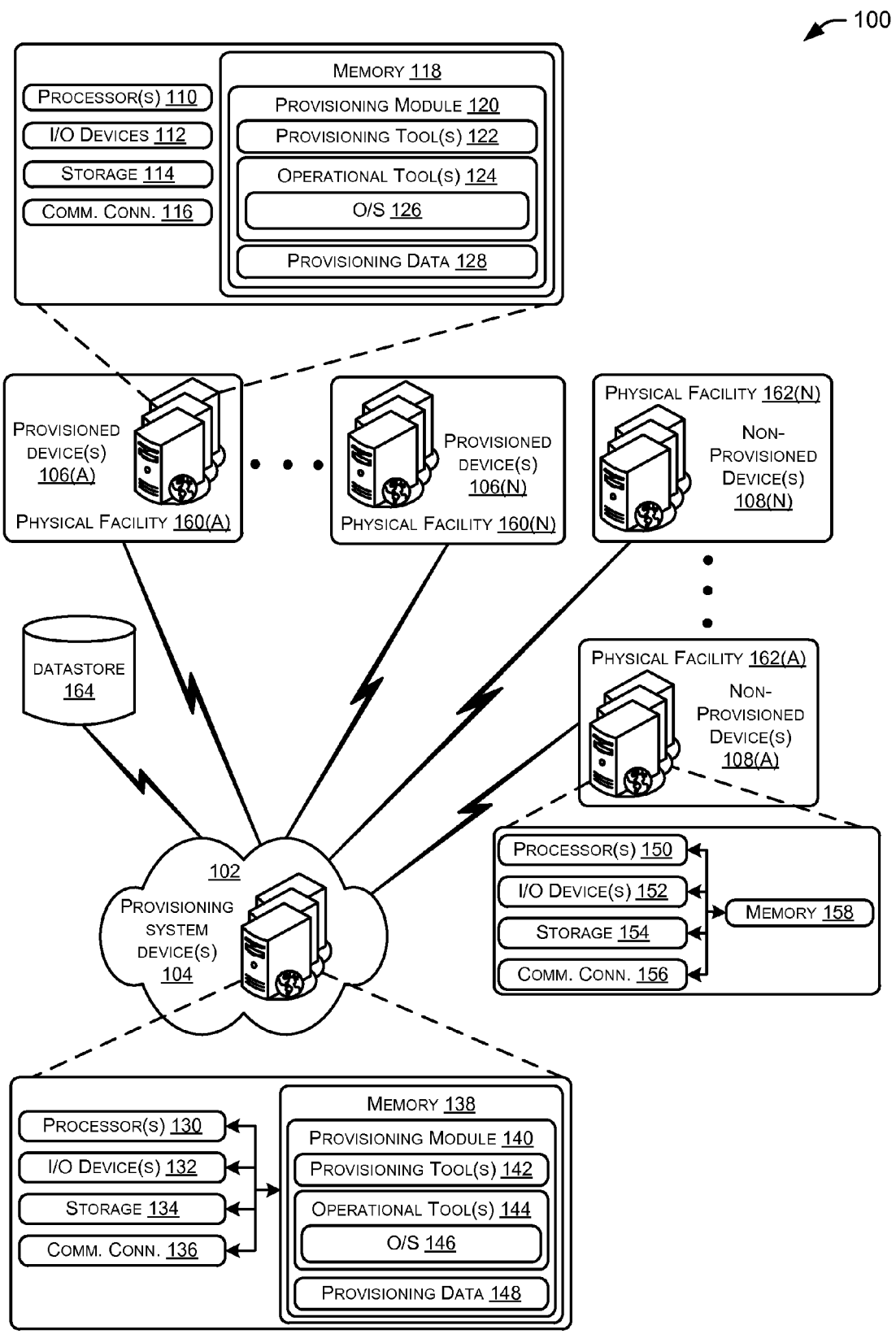
FIG. 1 depicts an exemplary architecture for providing a provisioning system configured to serially interact with sets of provisioned device(s) and/or sets of non-provisioned device(s), in accordance with one or more embodiments of the disclosure.

Illustrative embodiments of the disclosure relate to, among other things, use of a provisioning environment to provision a set of initially non-provisioned devices located at a physical facility. A facility may be a data center, a fulfillment center, or any other one or more physical locations associated with one or more operational activities. Provisioning a set of devices may alternatively be referred to herein as establishing a provisioned state for the set of devices. As used herein, "provisioning" a device may refer to evolving a device to a state in which the device is capable of providing desired functionality. Further, as used herein, the term "provisioning environment" or "provisioning system" may refer to a networked environment or a networked system comprising one or more devices that may be located remotely from a set of devices at a facility, and which may be used to provision the set of remotely located devices. In one or more embodiments, the provisioning environment may be provided as at least part of a service provider environment. Further, in various embodiments, the provisioning environment may include one or more provisioning devices (e.g., servers). One or more virtual provisioning machines may be established in connection with the provisioning device(s).

According to various embodiments, the provisioned state established for a set of devices may comprise a respective operational configuration established for each device of the set of devices. The provisioned state established for a set of devices may be established based at least in part on a provisioning state associated with the virtual provisioning machine(s). More specifically, computer-executable instructions and/or data stored in a portion of memory of the provisioning devices that is allocated to the virtual provisioning machines may establish the provisioning state for the virtual provisioning machines and may be used to provision a set of devices.

According to one or more embodiments of the disclosure, the provisioning environment (or more specifically the provisioning devices and the virtual provisioning machines running thereon) may serve as an intermediate holding area for storing software provisioning tools and/or data that may be associated with a provisioned state of a set of provisioned devices at an existing facility, and which may be used to provision (e.g., bootstrap), or otherwise bring to an operational state, a set of initially non-provisioned devices located at another facility. In certain embodiments, a snapshot of the provisioning environment that represents the provisioning state associated with the virtual provisioning machines may be stored in one or more datastores. The virtual provisioning machines may be deleted and rebuilt, and the provisioning state associated with the virtual provisioning machines may again be established using the stored snapshot.

The set of non-provisioned devices to be bootstrapped may include, for example, one or more computing devices and/or one or more networking devices. The one or more computing devices may include, but are not limited to, server computers, mainframe computers, workstations, personal computers, or any other type of computing device. As used herein, the term "networking device" may refer to any device capable of facilitating, at least in part, a connection between two or more computing devices. The one or more networking devices may include, but are not limited to, gateways, routers, network bridges, switches, hubs, repeaters, multilayer switches, protocol converters, or bridge routers.

As previously noted, a provisioned state for a set of initially non-provisioned devices, or more specifically, a respective operational configuration for each initially non-provisioned device, may be established by executing computer-executable provisioning instructions stored in association with virtual provisioning machines running on provisioning devices forming at least part of a provisioning environment, transmitting at least a portion of the provisioning instructions to the set of devices to be bootstrapped, transmitting at least a portion of the provisioning data stored in association with the virtual provisioning machines to the set of devices to be bootstrapped, and/or causing the set of devices to execute at least a portion of the provisioning instructions. The provisioning instructions and/or the provisioning data may, in certain embodiments, be associated with a provisioned state of a set of provisioned devices located at a trusted facility different from the facility where the non-provisioned devices are located. A trusted facility may refer to a facility that securely interacts with a service provider environment that the provisioning environment may form part of.

In one or more embodiments of the disclosure, the connection established between the provisioning environment and the non-provisioned devices may be a virtual private network (VPN) connection that employs VPN tunneling to establish the connection over, at least in part, a public Internet infrastructure. However, embodiments of the disclosure are not so limited, and any connection protocol known in the art or which may be developed in the future for providing such a connection may be employed.

The one or more provisioning devices that form at least part of the provisioning environment may include, but are not limited to, one or more computing devices and/or one or more networking devices, which may include, but are not limited to, any of the computing devices and/or networking devices described above through reference to the non-provisioned devices.

The computer-executable provisioning instructions stored in a portion of memory of the provisioning devices that is allocated to the virtual provisioning machines may include, but are not limited to, software provisioning tools that implement various protocols for configuring a device and/or transferring other software or software packages to the device, tools for managing the transfer of provisioning data (e.g., configuration data) or other data to the device, and so forth. The computer-executable provisioning instructions may further include, but are not limited to, operational tools including operational software such as, for example, disk images that may include the contents of a data storage device such as random access memory (RAM) disk images, pre-compiled computer-executable instructions for installing an operating system or one or more applications, operating system software, application(s) software, and so forth. The provisioning data, which may also be stored in a portion of memory of the provisioning devices that is allocated to the virtual provisioning machines, may include any data including, but not limited to, configuration data or any other data associated with the provisioning of devices.

It should be noted that while the provisioning instructions and provisioning data are at times referred to herein as being stored in portion(s) of memory of the provisioning devices that are allocated to the virtual provisioning machines, the provisioning instructions and/or provisioning data may also at times be referred to herein as being received and stored by the virtual provisioning machines themselves. It should further be noted that the computer-executable provisioning instructions are not limited to software and may include, but are not limited to, firmware, microcode, or any other computer-executable instructions or data capable of being executed or manipulated by a processing device to perform various operations. In various embodiments, various provisioning tools may include various operational tools and vice versa.

In one or more embodiments of the disclosure, the computer-executable provisioning instructions and/or the provisioning data may be received by the provisioning devices of a provisioning system or provisioning environment (or the virtual provisioning machines executing on the provisioning devices) via a connection to one or more devices that have already been provisioned. The connection established between the provisioning system and the set of provisioned devices may be a VPN connection that employs VPN tunneling to establish a secure connection over, at least in part, a public Internet infrastructure. However, embodiments of the disclosure are not so limited and any connection protocol known in the art or which may be developed in the future for providing a secure connection may be employed.

The provisioning devices of the provisioning system may establish a connection with the provisioned devices and receive the computer-executable provisioning instructions and/or the provisioning data from the provisioned devices. The provisioning instructions and/or provisioning data may be stored in portion(s) of memory of the provisioning devices that are allocated to the virtual provisioning machines. The provisioning instructions and/or provisioning data may establish a provisioning state for the virtual provisioning machines based on which the virtual provisioning machines may provision other devices. Throughout this disclosure, reference to establishing or terminating a connection between the provisioning devices and a set of devices may also be referred to as establishing or terminating a connection between the provisioning environment or the provisioning system and a set of devices.

In one or more other embodiments, the provisioning devices that form at least part of the provisioning system and/or provisioning environment may establish a connection with one or more datastores that store a snapshot representative of a prior provisioning state of the virtual provisioning machines. The snapshot may include computer-executable provisioning instructions and/or provisioning data. The provisioning devices may receive the provisioning instructions and/or the provisioning data from the datastore(s) and store the received provisioning instructions and/or provisioning data in various portion(s) of memory of the provisioning devices that are allocated to the virtual provisioning machines.

In various embodiments, a snapshot of a provisioning state of the virtual provisioning machines may be stored in the datastore(s) prior to establishing a connection with a set of non-provisioned devices. The snapshot may, in various embodiments, represent a mirrored copy of those portions of the memory of the provisioning devices that store the provisioning instructions and/or provisioning data associated with the provisioning state of the virtual provisioning machines. The snapshot may be retrieved at a later point to re-establish the provisioning state for the virtual provisioning machines. For example, the virtual provisioning machines may become corrupted during provisioning or attempted provisioning of a set of non-provisioned devices. If corrupted, the virtual provisioning machines may be deleted and rebuilt, and the provisioning state for the virtual provisioning machines may again be established using the stored snapshot. Re-establishing the provisioning state for the virtual provisioning machines using the stored snapshot may be more efficient than establishing the provisioning state via a connection to a set of provisioned devices.

According to conventional processes, building-out a facility may involve physically locating the device equipment at the facility, manually configuring servers and other network equipment using, for example, out of band management, and manually loading the appropriate software onto the manually configured device equipment from physical media physically transported to the facility. Alternatively, according to some conventional processes, the device equipment is manually configured to an extent necessary to allow for a VPN connection to be established between the device equipment at the facility and a cluster of devices associated with another facility that have already been provisioned. The cluster of provisioned devices may include manually configured servers and networking devices. The device equipment at the facility being built-out may then be bootstrapped from the manually configured provisioned devices to provide a sufficient level of device configuration to perform various automated builds for the non-provisioned devices in order to provision the devices.

There are various disadvantages associated with these conventional processes. First, they are labor intensive in that significant effort must be expended in manually configuring the device equipment at the facility being built-out and, potentially, manually imaging the device equipment with the necessary software. Second, even in those scenarios in which the manual effort is reduced by establishing a VPN connection between the non-provisioned device equipment and a parent cluster of provisioned devices and bootstrapping the device equipment using software running on the parent cluster devices, security-related issues arise. More specifically, the device equipment to be provisioned may be associated with an open network at an un-trusted location, and connecting the device equipment to provisioned devices associated with a trusted location may expose the trusted location to security vulnerabilities associated with the open network at the un-trusted location.

According to one or more embodiments of the disclosure, using a provisioning environment that includes provisioning devices running virtual provisioning machines in order to provision initially non-provisioned devices connected to an open and un-trusted network alleviates the security concerns of connecting the open and un-trusted network to provisioned devices associated with a trusted and secure network, while still allowing automated provisioning of software for bootstrapping the devices associated with the un-trusted location. For example, as previously noted, if the virtual provisioning machines are corrupted as a result of the connection to the non-provisioned devices at the un-trusted location, the virtual provisioning machines may be destroyed and re-built, and the provisioning state associated with the virtual provisioning machines may again be established using a stored snapshot representing a state of the provisioning environment prior to corruption of the virtual provisioning machines. Alternatively, the provisioning state may be re-established via a connection between the provisioning environment and a set of pre-provisioned devices associated with a trusted facility. Once the provisioning state associated with the virtual provisioning machines is re-established, bootstrapping of the non-provisioned devices at the un-trusted location may once again be attempted.

According to one or more further embodiments of the disclosure, the virtual provisioning machines running on provisioning devices forming part of a provisioning environment or provisioning system may serve as a migrant and easily disposable set of provisioning devices that may be used to provision one or more sets of initially non-provisioned devices, each of which is associated with a respective physical facility. As a non-limiting example, a connection may be established between the provisioning devices of a provisioning environment and a first set of provisioned devices. The provisioning devices may be executing virtual provisioning machines that may receive from the set of provisioned devices computer-executable provisioning instructions and/or provisioning data for establishing a provisioning state for the virtual provisioning machines. The provisioning instructions and/or provisioning data may be alternately thought of as being received by the provisioning devices and stored in memory thereof allocated to the virtual provisioning machines. For example, the provisioning devices may communicate with a provisioning module stored on at least one device of the set of provisioned devices to receive the provisioning instructions and/or the provisioning data. The provisioned state capable of being established for a set of non-provisioned devices based on the provisioning state associated with the virtual provisioning machines may, in various embodiments, correspond to the provisioned state of the set of provisioned devices.

The provisioning instructions may include, but are not limited to, provisioning tools for implementing various configuration and file transfer protocols and/or for performing various automated builds. The provisioning instructions may further include operational tools including, but not limited to, operating system software and/or applications software. As used herein, the term "first portion of computer-executable provisioning instructions," or some variation thereof, may be used to refer to the provisioning tools, and the term "second portion of the computer-executable provisioning instructions," or some variation thereof, may be used to refer to the operational tools. However, it will be apparent to one of ordinary skill in the art that these terms are used for convenience and that overlap between the provisioning tools and the operational tools may exist.

Upon receiving the provisioning instructions and/or the provisioning data from the set of provisioned devices, the provisioning environment may terminate the connection between the provisioning device and the set of provisioned devices. Upon termination of the connection with the set of provisioned devices, the provisioning instructions and/or the provisioning data received from the set of devices may be stored in portions(s) of memory of the provisioning devices allocated to the virtual provisioning machines. Thus, the virtual provisioning machines may appear, to sets of non-provisioned devices with which subsequent connections are serially established, as a provisioned set of devices.

The provisioning environment may then establish a connection between the provisioning devices and, for example, a second set of initially non-provisioned devices located at a potentially un-trusted location. The virtual provisioning machines may facilitate establishment of a provisioned state for the second set of devices based at least in part on the provisioning state associated with the virtual provisioning machines. More specifically, the virtual provisioning machines may execute at least a portion of the provisioning instructions, transmit at least a portion of the provisioning instructions and/or at least a portion of the provisioning data to the second set of devices, and/or cause the second set of devices to execute at least a portion of the provisioning instructions in order to establish the provisioned state for the second set of devices.

According to one or more embodiments, some but not all of the devices of the second set of initially non-provisioned devices may obtain an operational configuration (e.g., become provisioned or bootstrapped) while the provisioning environment (provisioning system) is connected to the second set of devices. That is, the virtual provisioning machines may execute and/or transmit at least a portion of the provisioning instructions and/or transmit at least a portion of the provisioning data to one or more devices of the second set of devices in order to provision those particular devices, and at least one device of the second set of devices may establish respective operational configuration(s) associated therewith further based on at least a portion of the provisioning instructions and/or at least a portion of the provisioning data transmitted to the provisioned devices. That is, various device(s) of the second set of devices may be provisioned based solely from other device(s) of the second set of devices that have already been provisioned by the virtual provisioning machines. Thus, in certain embodiments, a provisioned state for the second set of devices, which may correspond to a respective operational configuration for each device included therein, may be established subsequent to termination of the connection with the provisioning devices of the provisioning environment. Stated in different terms, in accordance with one or more specific embodiments of the disclosure, at least one device of the second set of initially non-provisioned devices may be bootstrapped subsequent to termination of the connection with the provisioning devices from other device(s) of the second set of devices that were bootstrapped prior to termination of the connection.

Alternatively, in one or more embodiments of the disclosure, the provisioning devices may remain connected to the second set of devices until a respective operational configuration is established for each device, and thus, until all devices of the second set of devices have been provisioned. In such embodiments, each device of the second set of devices may be provisioned based at least in part on the provisioning state associated with the virtual provisioning machines by executing at least a portion of the provisioning instructions, transmitting at least a portion of the provisioning instructions and/or transmitting at least a portion of the provisioning data to each device of the second set of devices, and/or causing at least certain device(s) of the second set of devices to execute at least a portion of the provisioning instructions transmitted thereto in order to provision other devices of the second set of devices.

In still further embodiments of the disclosure, scenarios may exist where a facility does not have a sufficient amount, type or configuration of devices to provide all required services. For example, a facility may not have the necessary amount of physical server infrastructure to support all desired services. In such embodiments, the provisioning environment may maintain the connection between the provisioning devices and the devices of the facility or establish the connection as necessary in order to provide services that would typically be performed by the devices of the facility but cannot be instantiated due to insufficient resources at the facility. In other embodiments, even if the facility has sufficient resources for providing all desired services, some of the services (e.g., non-latency critical services) may be offloaded to the virtual provisioning machines and a connection with the provisioning devices running the virtual provisioning machines may be established when such services are required. Such an implementation would free up resources at the facility for potentially more cost-effective use.

As previously noted, the disposable and re-usable nature of the virtual provisioning machines provides greater security and flexibility in establishing a provisioned state for a set of initially non-provisioned devices as compared to establishing a connection between the set of initially non-provisioned devices and a set of provisioned devices associated with a trusted facility. For example, if the virtual provisioning machines are corrupted in some manner during the connection to the set of non-provisioned devices because, for example, the set of non-provisioned devices is connected to an open or at least partially unsecured network, the virtual provisioning machines may be deleted and rebuilt, and the provisioning instructions and/or the provisioning data may again be loaded into those portion(s) of the memory of the provisioning devices that are allocated to the virtual provisioning machines in order to once again establish a provisioning state for the virtual provisioning machines. The provisioning state associated with the virtual provisioning machines may be established again via a connection to datastore(s) storing a snapshot of a previous provisioning state of the provisioning environment or via a connection to a set of provisioned devices. Upon establishing the provisioning state for the virtual provisioning machines, the connection with the storage device(s) or the set of provisioned devices may be terminated, and the provisioning environment may subsequently re-establish a connection between the provisioning devices and the set of non-provisioned devices in order to provision the devices based on the re-established provisioning state of the virtual provisioning machines.

The virtual provisioning machines running on provisioning devices forming part of a provisioning system or a provisioning environment may also serve as a migrant set of temporarily provisioned devices having a temporary provisioning state associated therewith that may be used to establish respective provisioned states for a plurality of different sets of initially non-provisioned devices associated with respective physical facilities. For example, upon the provisioning of the second set of initially non-provisioned devices, the provisioning environment may terminate the connection between the provisioning devices and the second set of devices. The provisioning environment may then proceed to establish a connection between the provisioning devices and a third set of initially non-provisioned devices located at a different facility and provision the third set of devices based at least in part on the provisioning state associated with the virtual provisioning machines running on the provisioning devices. More specifically, the provisioning instructions and/or provisioning data may be utilized to provision the third set of devices. The provisioning environment may, in a similar fashion, terminate the connection between the provisioning devices and the third set of devices and serially establish connections with one or more additional sets of initially non-provisioned devices, where each additional set of non-provisioned devices is associated with a respective corresponding physical facility. In particular, the provisioning environment may establish a connection between the provisioning devices and a set of initially non-provisioned devices, provision the set of devices based at least in part on the provisioning state associated with the virtual provisioning machines, terminate the connection between the provisioning devices and the set of devices, and repeat the process for successive sets of initially non-provisioned devices in order to serially provision each set of devices.

Illustrative Architecture

FIG. 1 depicts an illustrative system architecture 100 for serially provisioning sets of initially non-provisioned devices using a provisioning environment that includes provisioning devices running virtual provisioning machines in accordance with one or more embodiments of the disclosure. It will be apparent to one of ordinary skill in the art that FIG. 1 is provided for illustrative purposes and that one or more components of the architecture may be absent, additional component(s) may be present, and/or one or more components may be modified across various embodiments of the disclosure.

The system architecture 100 includes a provisioning system comprising one or more provisioning devices 104. The provisioning system may form at least part of a provisioning environment 102. The provisioning devices 104 may include one or more computing devices and/or one or more networking devices. The provisioning environment 102 may form at least part of a service provider environment. The provisioning devices 104 may include one or more virtual provisioning machines. The virtual provisioning machines may correspond to virtual machines, each of which includes an operating system and application(s) software loaded into portion(s) of memory of the provisioning devices which are allocated to the virtual provisioning machine. The provisioning devices 104 may be capable of interacting with devices outside of the provisioning environment 102, while one or more restrictions may be placed on the degree and manner to which devices external to the provisioning environment 102 (or a service provider environment that may include the provisioning environment 102) may access the provisioning devices 104 and information stored therein.

As previously noted, the provisioning devices 104 may comprise one or more computing devices such as, for example, one or more servers or other computing devices. Each computing device of the provisioning devices 104 may include, in an illustrative configuration, at least one memory 138 and one or more processing units (or processor(s)) 130. In some examples, the processor(s) 130 of the provisioning devices 104 may be implemented, as appropriate, in hardware, software, firmware, or combinations thereof. Software or firmware implementations of the processor(s) 130 may include computer-executable or machine-executable instructions written in any suitable programming language to perform various operations. Hardware implementations of the processor(s) 130 may be configured to execute computer-executable or machine-executable instructions to perform various operations.

The memory 138 may store computer-executable instructions that are loadable and executable by the processor(s) 130, as well as data manipulated or generated during the execution of the computer-executable instructions. Depending on a configuration and type of the provisioning devices 104, the memory 138 may be volatile (such as random access memory (RAM)) and/or non-volatile (such as read-only memory (ROM), flash memory, etc.). The provisioning devices 104 (or more specifically the computing devices of the provisioning devices) may also include additional storage 134, which may include removable storage and/or non-removable storage. The additional storage 134 may include, but is not limited to, magnetic storage, optical disk storage, and/or tape storage. The disk drives and their associated computer-readable media may provide non-volatile storage of computer-executable instructions, data structures, program modules, and/or other data. In various implementations, the memory 138 may include multiple different forms or types of memory, such as static random access memory (SRAM), dynamic random access memory (DRAM), and/or ROM.

The memory 138 and/or the additional storage 134, both removable and non-removable, are examples of computer-readable storage media. For example, computer-readable storage media may include volatile or non-volatile, removable or non-removable media implemented according to any method or technology for storage of information such as computer-executable instructions, data structures, program modules, and/or other data.

The provisioning devices 104 may also include communications connection(s) 136 that allow the provisioning devices 104 to communicate with stored databases, other computing devices or servers, user terminals, and/or other devices within the provisioning environment 102 or a service provider environment that the provisioning environment 102 may be part of, or other devices across one or more public or private networks including any one or more of a combination of different types of suitable communications networks, such as cable networks, the Internet, wireless networks, cellular networks, and other private and/or public networks. The provisioning devices 104 may also include input/output (I/O) device(s) 132, such as a keyboard, a mouse, a pen, a voice input device, a touch input device, a display, speakers, a printer, etc. However, in various embodiments, the I/O device(s) 132 may not be present in connection with the provisioning devices 104.

Turning to the contents of the at least one memory 138 in more detail, the memory 138 may include a provisioning module 140 that may include a provisioning tool(s) sub-module 142, an operational tool(s) sub-module 144, and provisioning data 148. The provisioning module 140 may be stored in portion(s) of the memory 138 that are allocated to the one or more virtual provisioning machines. In accordance with various embodiments of the disclosure, at least a portion of the provisioning instructions included in the provisioning tool(s) sub-module 142 and/or the operational tool(s) sub-module 144 may be executed and/or transmitted to a set of initially non-provisioned devices, and at least a portion of the provisioning data 148 included in the provisioning module 140 may be transmitted to the set of initially non-provisioned devices in order to provision the set of initially non-provisioned devices.

In accordance with one or more embodiments of the disclosure, the provisioning tool(s) sub-module 142 may comprise provisioning tools that implement various protocols for configuring a device and/or for transferring other software or software packages to the device (e.g., provisioning instructions included in the operational tool(s) sub-module 144), tools for managing the transfer of the provisioning data 148 (e.g., configuration data) to the device, and so forth. The operational tool(s) sub-module 144 may comprise operational tools including operational software such as, for example, disk images that may include the contents of a data storage device such as RAM disk images, data files, pre-compiled computer-executable instructions for installing an operating system or one or more applications, an operating system (0/S) 146 which may be any operating system now known in the art or which may be developed in the future, applications software, and so forth.

The illustrative system architecture 100 further includes one or more sets of provisioned devices 106(A)-106(N) and one or more sets of non-provisioned devices 108(A)-108(N). Each set of provisioned devices 106(A)-106(N) may be associated with a respective corresponding physical facility 160(A)-160(N) and may have an operational state (e.g., a provisioned state) associated therewith. Each set of non-provisioned devices 108(A)-108(N) may similarly be associated with a respective corresponding facility 162(A)-162(N). An operational state (e.g., provisioned state) of each set of the initially non-provisioned devices 108(A)-108(N) may be established via serial connection(s) to the provisioning devices 104 of the provisioning environment 102.

A particular set of provisioned devices 106(A) will be described in more detail hereinafter for illustrative purposes. However, the following discussion is equally applicable to each set of provisioned devices 106(A)-106(N). One or more of the provisioned devices (e.g., computing devices) of the set of provisioned devices 106(A) may each include at least one memory 118 and one or more processing units (or processor(s)) 110. In some examples, the processor(s) 110 of the provisioned devices 106(A) may be implemented, as appropriate, in hardware, software, firmware, or combinations thereof. Software or firmware implementations of the processor(s) 110 may include computer-executable or machine-executable instructions written in any suitable programming language to perform various operations. Hardware implementations of the processor(s) 110 may be configured to execute computer-executable or machine-executable instructions to perform various operations.

The memory 118 may store computer-executable instructions that are loadable and executable by the processor(s) 110, as well as data manipulated or generated during the execution of the computer-executable instructions. Depending on a configuration and type of the provisioned devices 106(A), the memory 118 may be volatile (such as random access memory (RAM)) and/or non-volatile (such as read-only memory (ROM), flash memory, etc.). The provisioned devices 106(A) (or more specifically the computing devices of the provisioned devices 106(A)) may also include additional storage 114, which may include removable storage and/or non-removable storage. The additional storage 114 may include, but is not limited to, magnetic storage, optical disk storage, and/or tape storage. The disk drives and their associated computer-readable media may provide non-volatile storage of computer-executable instructions, data structures, program modules, and other data. In various implementations, the memory 118 may include multiple different forms or types of memory, such as static random access memory (SRAM), dynamic random access memory (DRAM), and/or read-only memory (ROM).

The memory 118 and/or the additional storage 114, both removable and non-removable, are examples of computer-readable storage media. For example, computer-readable storage media may include volatile or non-volatile, removable or non-removable media implemented according to any method or technology for storage of information such as computer-executable instructions, data structures, program modules, and/or other data.

The provisioned devices 106(A) may also include communications connection(s) 116 that allow the provisioned devices 106(A) to communicate with stored databases, other computing devices or servers, user terminals, the provisioning devices 104 within the provisioning environment 102, and/or other devices across one or more public or private networks including any one or more of a combination of different types of suitable communications networks, such as cable networks, the Internet, wireless networks, cellular networks, and other private and/or public networks. The provisioned devices 106(A) may further include input/output (I/O) device(s) 112, such as a keyboard, a mouse, a pen, a voice input device, a touch input device, a display, speakers, a printer, etc. However, in various embodiments, the I/O device(s) 112 may not be present in connection with the provisioned devices 106(A).

Turning to contents of the at least one memory 118 in more detail, the memory 118 may include a provisioning module 120 that may include a provisioning tool(s) sub-module 122, an operational tool(s) sub-module 124, and provisioning data 128. In accordance with various embodiments of the disclosure, the provisioning tool(s) sub-module 122 and the operational tool(s) sub-module 124 may comprise computer-executable provisioning instructions that may be received by the provisioning devices 104 and stored in portion(s) of the memory 118 allocated to the virtual provisioning machines in order to establish a provisioning state associated with the virtual provisioning machines, and which may be used, in conjunction with the provisioning data 128, to provision one or more sets of initially non-provisioned devices (e.g., one or more sets of non-provisioned devices 108(A)-108(N)).

In accordance with one or more embodiments of the disclosure, the provisioning tool(s) sub-module 122 may comprise provisioning tools that implement various protocols for configuring a device and/or transferring other software or software packages to the device (e.g., provisioning instructions of the operational tool(s) sub-module 124), tools for managing the transfer of the provisioning data 128 to the device, and so forth. The operational tool(s) sub-module 124 may comprise operational tools including operational software such as, for example, disk images that may include the contents of a data storage device such as RAM disk images, data files, pre-compiled computer-executable instructions for installing an operating system or one or more applications, an operating system (O/S) 126 which may be any operating system now known in the art or which may be developed in the future, applications software, and so forth.

The illustrative system architecture 100 depicted in FIG. 1 further includes one or more sets of non-provisioned devices 108(A)-108(N). As previously noted, each set of non-provisioned devices 108A-108N may be associated with a respective corresponding facility 162(A)-162(N) and may not yet have been provisioned. Each set of non-provisioned devices 108(A)-108(N) may include one or more computing devices and/or one or more networking devices. A particular set of non-provisioned devices 108(A) will be described in more detail hereinafter for illustrative purposes. However, the following discussion is equally applicable to each set of non-provisioned devices 108(A)-108(N).

One or more of the non-provisioned devices (e.g., one or more non-provisioned computing devices) of the set of non-provisioned devices 108(A) may each include at least one memory 158 and one or more processing units (or processor(s)) 150. In some examples, the processor(s) 150 of the non-provisioned devices 108(A) may be implemented, as appropriate, in hardware, software, firmware, or combinations thereof. Software or firmware implementations of the processor(s) 150 may include computer-executable or machine-executable instructions written in any suitable programming language to perform various operations. Hardware implementations of the processor(s) 150 may be configured to execute computer-executable or machine-executable instructions to perform various operations.

The memory 158 may store computer-executable instructions that are loadable and executable by the processor(s) 150, as well as data manipulated or generated during the execution of the computer-executable instructions. Depending on a configuration and type of the non-provisioned devices 108(A), the memory 158 may be volatile (such as random access memory (RAM)) and/or non-volatile (such as read-only memory (ROM), flash memory, etc.). The non-provisioned devices 108(A) (or more specifically the computing devices of the non-provisioned devices 108(A)) may also include additional storage 154, which may include removable storage and/or non-removable storage. The additional storage 154 may include, but is not limited to, magnetic storage, optical disk storage, and/or tape storage. The disk drives and their associated computer-readable media may provide non-volatile storage of computer-executable instructions, data structures, program modules, and other data. In various implementations, the memory 158 may include multiple different forms or types of memory, such as static random access memory (SRAM), dynamic random access memory (DRAM), and/or ROM.

The memory 158 and/or the additional storage 154, both removable and non-removable, are examples of computer-readable storage media. For example, computer-readable storage media may include volatile or non-volatile, removable or non-removable media implemented according to any method or technology for storage of information such as computer-executable instructions, data structures, program modules, and/or other data.

The non-provisioned devices 108(A) may also include communications connection(s) 156 that allow the non-provisioned devices 108(A) to communicate with stored databases, other computing devices or servers, user terminals, the provisioning devices 104 within the provisioning environment 102, and/or other devices across one or more public or private networks including any one or more of a combination of different types of suitable communications networks, such as cable networks, the Internet, wireless networks, cellular networks, and other private and/or public networks. The non-provisioned devices 108(A) may further include input/output (I/O) device(s) 152, such as a keyboard, a mouse, a pen, a voice input device, a touch input device, a display, speakers, a printer, etc. However, in various embodiments, the I/O device(s) 152 may not be present in connection with the non-provisioned devices 108(A).

Since each of the non-provisioned devices of each of the sets of non-provisioned devices 108(A)-108(N) have not yet been provisioned according to the state of the architecture 100 shown in FIG. 1 (e.g., the non-provisioned devices have not yet been bootstrapped or otherwise made operational), the at least one memory 158 may not yet include a component similar to the provisioning module 120 or the provisioning module 140. However, as will be described in more detail through reference to subsequent drawings, the provisioning devices 104 of the provisioning environment 102 may establish a connection between the provisioning devices 104 and any one of the sets of provisioned devices 106(A)-106(N) (e.g., a VPN connection) and receive, from the set of provisioned devices, computer-executable provisioning instructions included in the provisioning tool(s) sub-module 122 and the operational tool(s) sub-module 124 and/or the provisioning data 128, and respectively store the received information as the provisioning tool(s) sub-module 142, the operational tool(s) sub-module 144, and the provisioning data 148 in portion(s) of the memory 138 allocated to the virtual provisioning machines in order to establish a provisioning state for the virtual provisioning machines. The provisioning environment 102 may then terminate the connection between the provisioning devices and the set of provisioned devices and establish a connection with any one of the sets of non-provisioned devices 108(A)-108(N). The provisioning environment may facilitate establishment of a provisioned state for the set of initially non-provisioned devices, which may include establishing an operational configuration for each of the initially non-provisioned devices in the set of non-provisioned devices based at least in part on the provisioning state associated with the virtual provisioning machines. More specifically, the provisioning devices 104 (or the virtual provisioning machines running thereon) may cause at least a portion of the provisioning instructions included in the provisioning tool(s) sub-module 142 and/or at least a portion of the provisioning instructions included in the operational tool(s) sub-module 144 to be executed and/or transmitted, potentially along with at least a portion of the provisioning data 148 to the set of non-provisioned devices 108(A) in order to provision the devices 108(A).

The illustrative system architecture 100 of FIG. 1 additionally depicts one or more datastore(s) 164 which may be trusted data storage devices. The datastore(s) 164 may store a snapshot representative of a provisioning state associated with the virtual provisioning machines generated in the provisioning devices 104. As such, the snapshot may include provisioning instructions and/or provisioning data for establishing a provisioning state associated with the virtual provisioning machines. For example, upon receipt, by the provisioning devices 104 of provisioning instructions and/or provisioning data from a particular set of provisioned devices (e.g., any of the sets of provisioned devices 106(A)-106(N)), a snapshot of a state of the provisioning devices 104 or of the virtual provisioning machines may be taken and stored in the datastore(s) 164. In this manner, if for any reason the virtual provisioning machines must be deleted due to, for example, a compromised connection with a set of non-provisioned devices that are being provisioned, the virtual provisioning machines may be rebuilt and the provisioning state associated therewith may be re-established via a connection between the provisioning devices 104 and the datastore(s) 164 in order to once again load the provisioning instructions and provisioning data included in the snapshot into portions of the memory 138 of the provisioning devices 104 that are allocated to the virtual provisioning machines.

Further, in one or more alternative embodiments, a connection may be established between the datastore(s) 164 and any one or more of the sets of provisioned devices 106(A)-106(N) such that a snapshot of the set(s) of provisioned devices may be taken and the associated provisioning instructions and provisioning data (included in the provisioning module 120) may be stored in the datastore(s) 164. The snapshot stored in the datastore(s) 164 may represent an existing production network associated with one or more sets of provisioned devices and may serve as a provisioning template for establishing a provisioning state associated with the virtual provisioning machines.

Further, according to one or more additional embodiments of the disclosure, only a portion of the provisioning instructions and/or provisioning data associated with a set of provisioned devices (which are representative of a subset of the elements or services provided by the set of provisioned devices) may be received by the provisioning devices 104 from the set of provisioned devices or from the datastore(s) 164. As such, it may be selectively determined which services provided by a set of provisioned devices will be replicated in the provisioning devices 104 (or more specifically in the provisioning state associated with the virtual provisioning machines) and provided to one or more sets of non-provisioned devices 108(A)-108(N).

In one or more embodiments of the disclosure, the provisioning environment 102 may serially establish connections between the provisioning devices 104 and the sets of provisioned devices 106(A)-106(N) and the sets of non-provisioned devices 108(A)-108(N). That is, in accordance with various embodiments of the disclosure, the provisioning devices 104 may only be connected to a particular set of provisioned devices or a particular set of non-provisioned devices at any given time. As such, according to various embodiments, the provisioning devices 104 may not simultaneously be connected with a set of provisioned devices and a set of non-provisioned devices, and may thus avoid exposing any of the sets of provisioned devices 106(A)-106(N), or their respective corresponding facilities 160(A)-160(N), to security vulnerabilities of any of the sets of non-provisioned devices 108(A)-108(N).

Illustrative Processes

Figure 2:
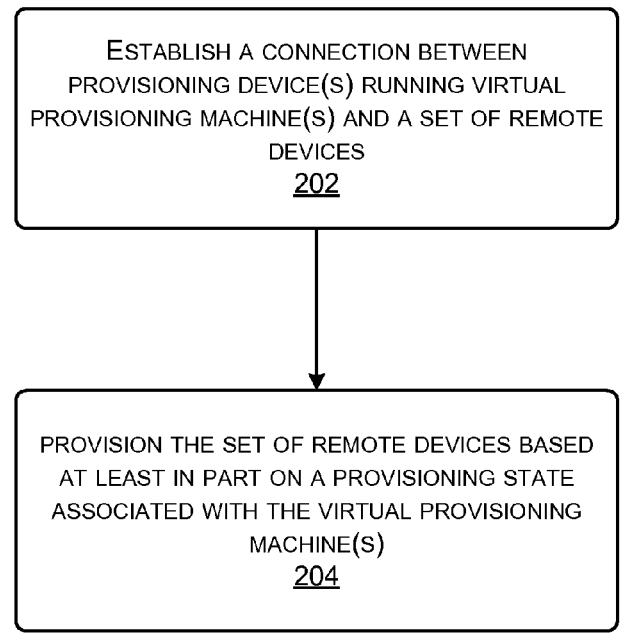
FIG. 2 is a process flow diagram illustrating a method for provisioning a set of initially non-provisioned devices using a provisioning environment that includes provisioning device(s) running one or more virtual provisioning machines in accordance with one or more embodiments of the disclosure.

Referring to FIG. 2, a process flow diagram is presented illustrating an example method 200 for provisioning a set of initially non-provisioned devices using a provisioning environment that includes provisioning devices running virtual provisioning machines in accordance with one or more embodiments of the disclosure.

At block 202 of the method 200, a provisioning environment establishes a connection between provisioning devices forming part of the provisioning environment and a set of devices located remotely from the provisioning environment. The connection established between the provisioning devices and the set of remote devices may be a virtual private network (VPN) connection that employs VPN tunneling to establish the connection over, at least in part, a public Internet infrastructure. However, embodiments of the disclosure are not so limited, and any connection protocol known in the art or which may be developed in the future for providing a connection may be employed.

The set of devices may be a set of non-provisioned devices for which an operational state has not yet been achieved (e.g., the set of devices has not been bootstrapped with software required to perform desired services at a physical facility with which the set of devices is associated), and may be any of the sets of non-provisioned devices 108(A)-108(N) depicted in FIG. 1. The provisioning devices may correspond to the provisioning devices 104 depicted in FIG. 1, and may have virtual provisioning machines running thereon. The provisioning devices may store, in portion(s) of memory allocated to the virtual provisioning machines, computer-executable provisioning instructions and/or provisioning data (e.g. computer-executable provisioning instructions included in the provisioning tool(s) sub-module 142 and in the operational tool(s) sub-module 144 and the provisioning data 148), which may establish a provisioning state for the virtual provisioning machines. The set of remote non-provisioned devices may be provisioned (e.g., brought to an operational state) based at least in part on the provisioning state of the virtual provisioning machines. The provisioning instructions and/or the provisioning data stored in the memory of the provisioning devices may have been previously received by the provisioning devices during a prior connection to a set of provisioned devices (e.g., any of the sets of provisioned devices 106(A)-106(N)) or during a prior connection to the datastore(s) 164 storing a snapshot of a provisioning state of the virtual provisioning machines.

At block 204 of the method 200, the set of initially non-provisioned devices may be provisioned based at least in part on the provisioning state associated with the virtual provisioning machines. More specifically, at least a portion of the provisioning instructions stored in portion(s) of memory of the provisioning devices that are allocated to the virtual provisioning machines (e.g. at least a portion of the computer-executable provisioning instructions included in the provisioning tool(s) sub-module 142 and/or the operational tool(s) sub-module 144) may be executed and/or transmitted to the remote devices and/or at least a portion of the provisioning data (e.g., the provisioning data 148) stored in portion(s) of the memory of the provisioning devices that are allocated to the virtual provisioning machines may be transmitted to the remote devices to facilitate provisioning of the devices.

As described earlier, the set of remote devices to be provisioned may be associated with a facility that may be untrusted because it is connected to or otherwise associated with an open network. Thus, although an authenticated VPN connection may be established between the provisioning devices and the remote non-provisioned devices, if the remote devices form part of or interact with an open network, there is a possibility that the virtual provisioning machines may become corrupted via the connection with the remote devices being provisioned. However, because a connection is not established between the set of non-provisioned devices and a set of provisioned devices associated with a trusted location, there is no security risk presented to any existing production environment associated with any set of provisioned devices. Further, because the virtual provisioning machines are disposable and capable of being rebuilt, and the provisioning instructions and/or provisioning data may again be loaded into memory of the provisioning devices, the connection between the provisioning devices and the remote devices may be terminated, the virtual provisioning machines may be deleted, rebuilt and re-provisioned, and the connection between the provisioning devices and the remote devices may again be established to provision the devices. Various mechanisms by which the provisioning devices may facilitate establishment of the provisioned state for a set of initially non-provisioned devices via virtual provisioning machines running on the provisioning devices are described in more detail below through reference to FIGS. 3-5.

Figure 3:
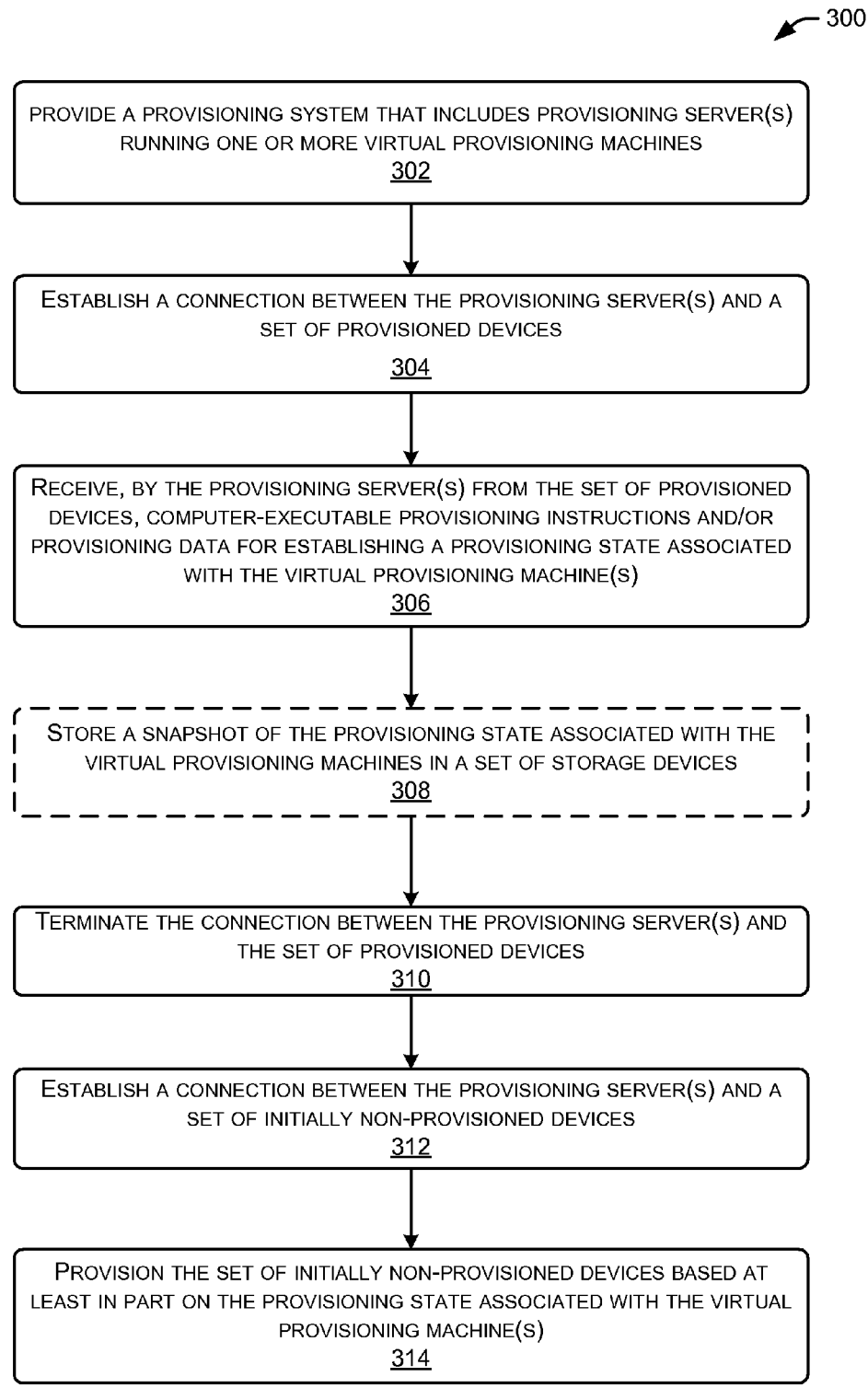
FIG. 3 is a process flow diagram illustrating a method for provisioning a set of initially non-provisioned devices based at least in part on a provisioning state associated with one or more virtual provisioning machines in accordance with one or more embodiments of the disclosure.

FIG. 3 is a process flow diagram illustrating a method 300 for provisioning a set of initially non-provisioned devices based at least in part on a provisioning state associated with virtual provisioning machines running on provisioning devices forming part of a provisioning environment in accordance with one or more embodiments of the disclosure.

At block 302 of the method 300, a provisioning system that includes one or more provisioning devices running one or more virtual provisioning machines may be provided. The provisioning devices may, for example, include one or more provisioning servers. The provisioning system may form at least part of a provisioning environment. The provisioning environment and the provisioning devices may respectively correspond, for example, to the provisioning environment 102 and the provisioning device(s) 104 depicted in FIG. 1.

At block 304 of the method 300, a connection may be established between the provisioning devices (e.g., servers) and a set of provisioned devices. The set of provisioned devices may be located remotely from the provisioning devices and the provisioning environment that the provisioning devices form part of. The set of provisioned devices may be provisioned with software tools and data that establish an operational state for the provisioned devices.

At block 306, the provisioning devices may receive from the set of provisioned devices computer-executable provisioning instructions and/or provisioning data for establishing a provisioning state for the virtual provisioning machines running on the provisioning devices. For example, the provisioning devices may communicate with a provisioning module stored on at least one of the set of provisioned devices to receive and store, in portion(s) of memory of the provisioning devices that are allocated to the virtual provisioning machines, the provisioning instructions and/or provisioning data included in the provisioning module. As previously described, the received provisioning instructions may include, but are not limited to, provisioning tools for implementing various configuration and file transfer protocols or for performing various automated builds or operational tools including operating system and/or applications software, and the received provisioning data may include, but is not limited to, configuration data.

At optional block 308 of the method 300, a snapshot of the provisioning state associated with the virtual provisioning machines may be stored in one or more datastores (e.g., storage devices). The snapshot may be, for example, one or more disk images representing at least a portion of the memory of the provisioning devices allocated to the virtual provisioning machines and which stores the provisioning instructions and/or provisioning data received from the set of provisioned devices. As previously discussed, the provisioning environment may access the datastore(s) at a later point in time if necessary to re-establish the provisioning state for the virtual provisioning machines based on the stored snapshot.

At block 310, the provisioning environment may terminate the connection between the provisioning devices and the set of provisioned devices. Optionally, according to one or more embodiments of the disclosure, the connection with the set of provisioned devices may be terminated prior to storing the snapshot.

At block 312, a connection may be established between the provisioning devices and a set of initially non-provisioned devices. The set of initially non-provisioned devices may be a set of non-provisioned devices associated with a potentially un-trusted facility. The set of non-provisioned devices may be located remotely from the set of provisioned devices and the provisioning devices.

At block 314, upon establishing the connection with the set of initially non-provisioned devices at block 312, the provisioning devices may facilitate provisioning of the set of initially non-provisioned devices based at least in part on the provisioning state associated with the virtual provisioning machines. More specifically, the virtual provisioning machines may provision the devices based at least in part on the provisioning instructions and/or the provisioning data associated with the virtual provisioning machines.

Although not depicted in FIG. 3, the provisioning environment may terminate the connection between the provisioning devices and the set of initially non-provisioned devices after transmitting the provisioning instructions and/or the provisioning data to the devices or may maintain the connection and continue to provide certain functionality for the devices even after the devices have been provisioned.

Figure 4A:
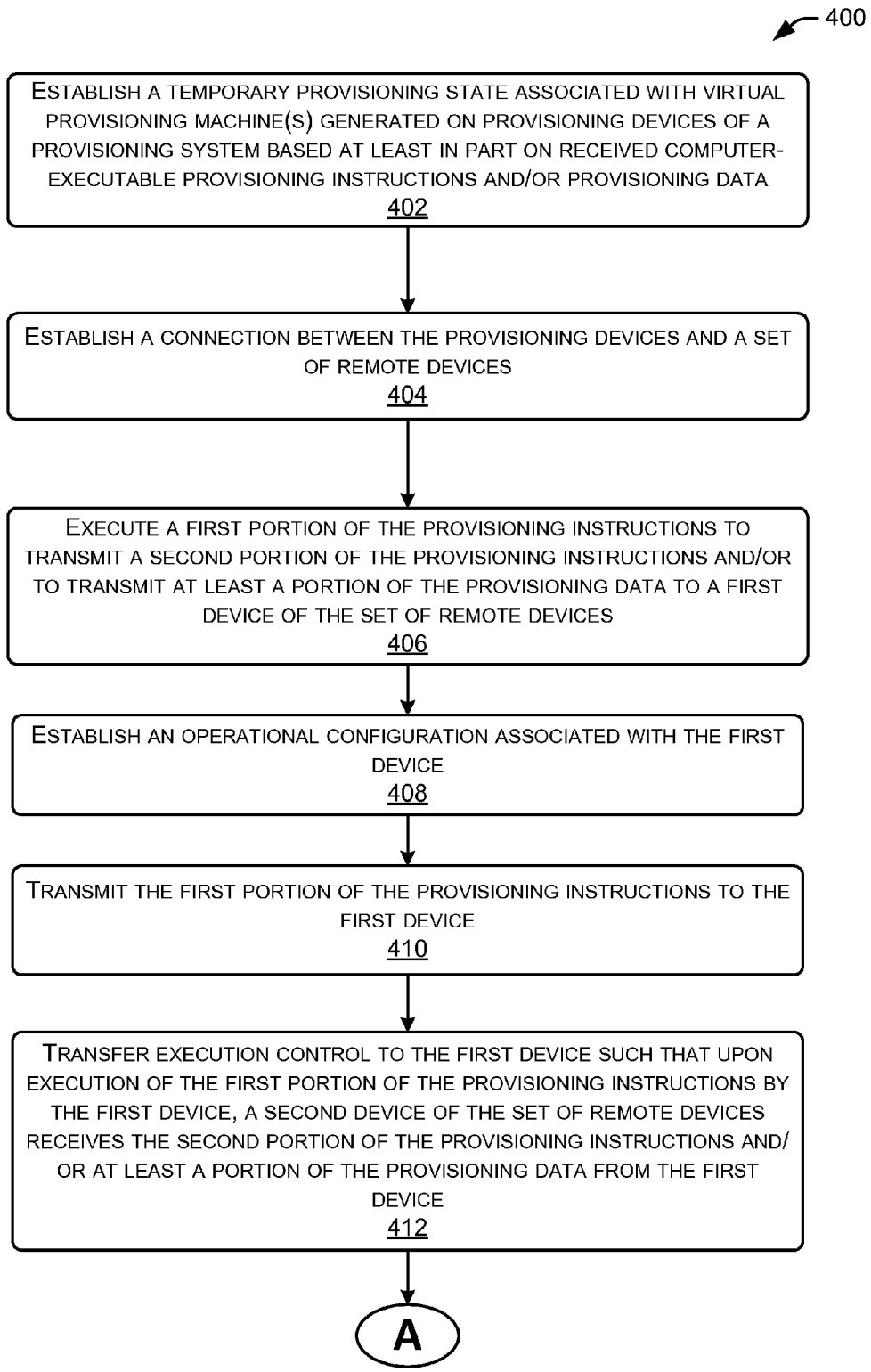
FIGS. 4A-4B depict process flow diagrams illustrating a method for provisioning a set of initially non-provisioned devices subsequent to termination of a connection between provisioning devices and the set of initially non-provisioned devices in accordance with one or more embodiments of the disclosure.
Figure 4B:
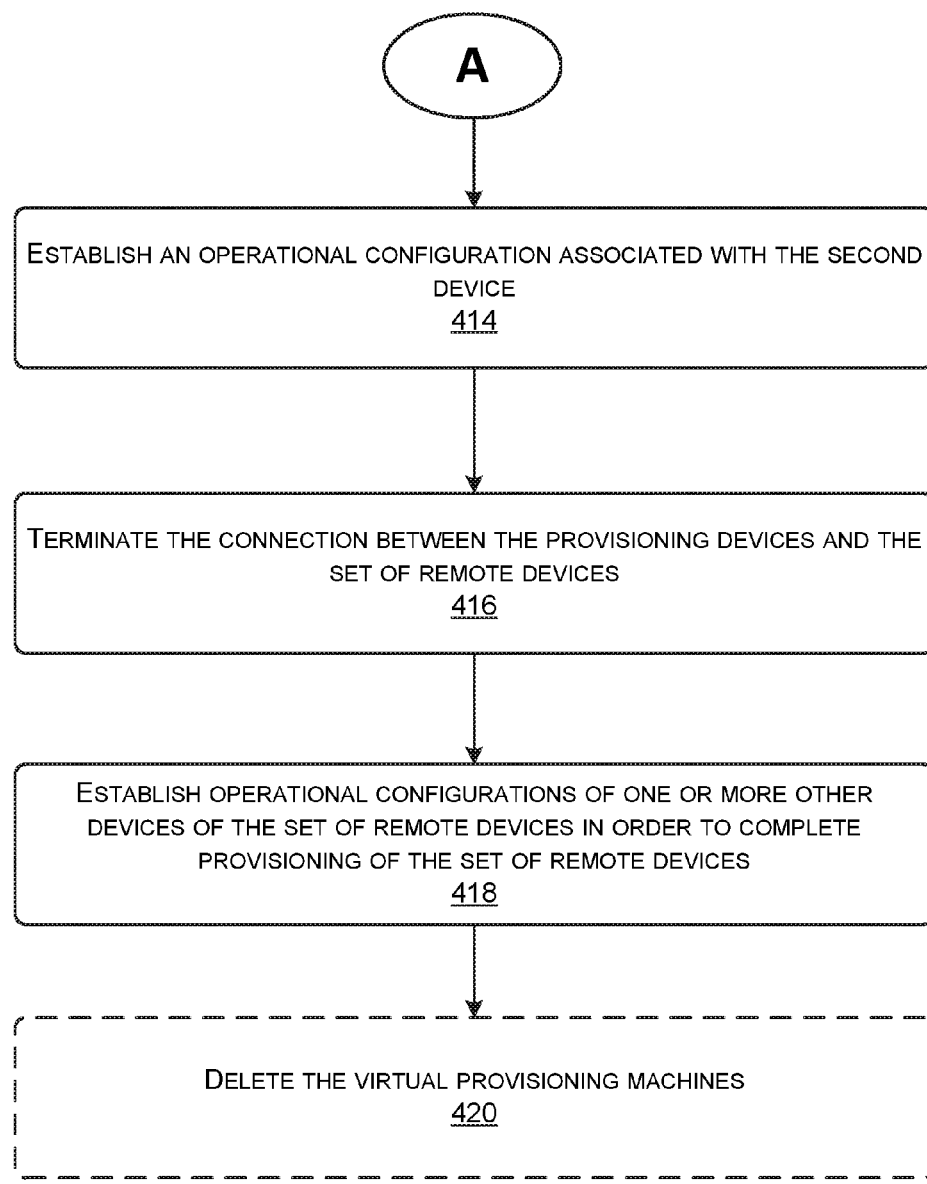

FIGS. 4A-4B depict process flow diagrams illustrating a method 400 for establishing a provisioned state for a set of devices subsequent to termination of the connection between the provisioning devices and the set of devices in accordance with one or more embodiments of the disclosure. As previously noted, provisioning a set of devices may comprise establishing respective operational configurations for each device in the set of devices.

At block 402 of the method 400, a temporary provisioning state may be established for virtual provisioning machines that are created and running on provisioning devices of a provisioning system. In accordance with one or more specific non-limiting embodiments of the disclosure, the provisioning system may be established within an allocated IP address space unused by devices at other facilities. The temporary provisioning state may be established based at least in part on provisioning instructions and/or provisioning data received from a set of provisioned devices or from datastore(s) storing a snapshot representative of a provisioning state of the virtual provisioning machines. For example, the provisioning devices of the provisioning system may establish a connection with a set of provisioned devices or datastore(s) storing the snapshot and receive the provisioning instructions and/or provisioning data stored therein into portion(s) of memory allocated to the virtual provisioning machines, and thereby establish the temporary provisioning state associated with the virtual provisioning machines.

According to one or more specific, non-limiting embodiments, the received provisioning instructions may include host provisioning tools that may be used to load an operating system and various other software tools capable of performing a variety of functions and services onto non-provisioned devices as part of a process of provisioning those devices. The provisioning instructions may include various out of band console management software, such as, for example, provisioning tools for implementing various configuration and file transfer protocols (e.g., Dynamic Configuration Host Protocol (DHCP), Trivial File Transfer Protocol (TFTP), etc.). Further, the provisioning instructions may include various operational tools such as disk images, operating system software, RPM Package Manager (RPM) software, and so forth. The provisioning instructions may, in fact, be the same or similar to the software used, at least in part, to provision the provisioning devices. The collection of software tools including provisioning tools and operational tools and the provisioning data that may be utilized to provision a set of devices (e.g., boot-strap a device such that the device is capable of providing desired services) may be referred to herein as computer-executable provisioning instructions and provisioning data, respectively.

At block 404 of the method 400, a connection may be established between the provisioning devices and a set of remote devices to be provisioned. The set of remote devices may be a set of non-provisioned devices associated with a physical facility located remotely from the provisioning system. The set of non-provisioned devices may, for example, include one or more servers that have not been provisioned.

At block 406, upon establishing the connection between the provisioning devices and the set of remote, non-provisioned devices at block 404, the virtual provisioning machines may causes a first portion of the computer-executable provisioning instructions to be executed to transmit a second portion of the computer-executable provisioning instructions and/or at least a portion of the provisioning data to a first device of the set of remote devices. According to one or more embodiments of the disclosure, the term "first portion of computer-executable provisioning instructions," or some variation thereof, may refer to one or more provisioning tools, and the term "second portion of the computer-executable provisioning instructions," or some variation thereof, may refer to at least one of the operational tools. For example, in certain embodiments, the "second portion of the computer-executable provisioning instructions" may include at least one of the operational tools stored in the memory of the provisioning devices such as, for example, at least the operating system software.

As such, according to one or more specific, non-limiting embodiments, once a first device (e.g., a first server) of the set of remote devices is powered on using, for example, out of band management tools available to the virtual provisioning machines running on the provisioning devices, the first server may issue a DHCP request that may be intercepted by the Institute of Electrical and Electronics Engineers (IEEE) 802.11 A/G router, and rather than being distributed to a local DHCP server, may be sent over the established connection with the provisioning devices. As the provisioning devices (or the virtual provisioning machines running thereon) are equipped to assume DHCP server functionality, the need to deploy a local DHCP server is obviated.

Still referring to the same specific, non-limiting example, the provisioning devices (or the virtual provisioning machines) may respond to the DHCP request from the first server with an Internet Protocol (IP) address. The first server may then issue a TFTP request that is routed to the provisioning devices, and more specifically to a TFTP server provided among the provisioning devices, which may be loaded with a RAM disc image. The first server may then boot-up and the RAM disc image may determine that an operating system needs to be loaded onto the first server. The associated calls may be made to the RPM operating in connection with the virtual provisioning machines to transfer various software to the first server to build up an operating system on the first server.

At block 408, an operational configuration associated with the first device may be established. In the context of the specific, non-limiting example being presented, upon loading an operating system on the first server, the first server may have obtained a respective operational configuration.

At block 410, the virtual provisioning machines may cause the first portion of the computer-executable provisioning instructions to be transmitted to the first device. In the context of the specific, non-limiting example presented, the first portion of the computer-executable provisioning instructions transmitted to the first server may include one or more provisioning tools such as, for example, software for providing the DHCP and TFTP services.

At block 412, execution control may be transferred from the virtual provisioning machines to the first device. Execution of the first portion of the provisioning instructions by the first device may cause a second device of the set of remote devices to receive the second portion of the computer-executable provisioning instructions and/or at least a portion of the provisioning data from the first device. In the context of the specific, non-limiting example presented, upon transmitting the provisioning tools for performing the DHCP and TFTP services to the first server, the router may be updated to point DHCP requests to the first server. A second server may be turned on and the first built server may perform DHCP and TFTP services for the second server. The first server may then receive the RPMs for installing an operating system on the second server.

At block 414, the second device may achieve a respective operational configuration. In the context of the specific, non-limiting example presented, a respective operational configuration associated with the second server may be established when an operating system is loaded on the second server. Subsequent to loading the operating system on the second server, the RPM repository may be transmitted to the second server. At this point in the specific, non-limiting example provided, all software services have been transmitted to the first and second servers among the set of remote devices.

At block 416, the connection between the provisioning devices and the set of remote devices may be terminated. At block 418, establishment of respective operational configurations associated with one or more other devices of the set of remote devices may be facilitated based at least in part on the respective operational configurations associated with the first and second devices. In the context of the specific, non-limiting example being provided, one or more additional servers may be fully bootstrapped from the provisioning tools, operational tools, and/or provisioning data loaded onto the first and second servers notwithstanding termination of the connection between the provisioning devices and the set of remote devices, as all foundational software services have been transmitted to the first and second devices. Once all devices of the set of remote devices have established respective operational configurations, the set of remote devices may be deemed as being provisioned.

At optional block 420, the virtual provisioning machines may be deleted. The virtual provisioning machines, if deleted, may be rebuilt and once again brought to a provisioning state via a connection to a provisioned set of devices or using a stored snapshot that is representative of a prior provisioning state of the virtual provisioning machines.

It will be apparent to one of ordinary skill in the art that specific operational steps may be omitted, added, or modified from the process flow depicted, for example, in FIGS. 4A and 4B. Purely by way of example, operational configurations of additional devices or fewer devices than the first and second devices may be established prior to termination of the connection with the provisioning devices. Alternatively, in one or more embodiments of the disclosure, the provisioning devices may remain connected to the set of remote devices until a respective operational configuration is established for each device, and thus, until a provisioned state is achieved for the set of remote devices.

In still further embodiments of the disclosure, the provisioning devices may be connected to the set of remote devices to facilitate provisioning of the devices, and may remain connected to the devices in order to provide services that would typically be performed solely by the set of remote and now provisioned devices but which cannot be instantiated due to insufficient resources at the facility. In still other embodiments, even if the set of remote and now provisioned devices have sufficient resources for providing all desired services, some of the services (e.g., non-latency critical services) may be offloaded to the virtual provisioning machines, and a connection with the provisioning devices may be maintained or established when such services are required.

Figure 5:
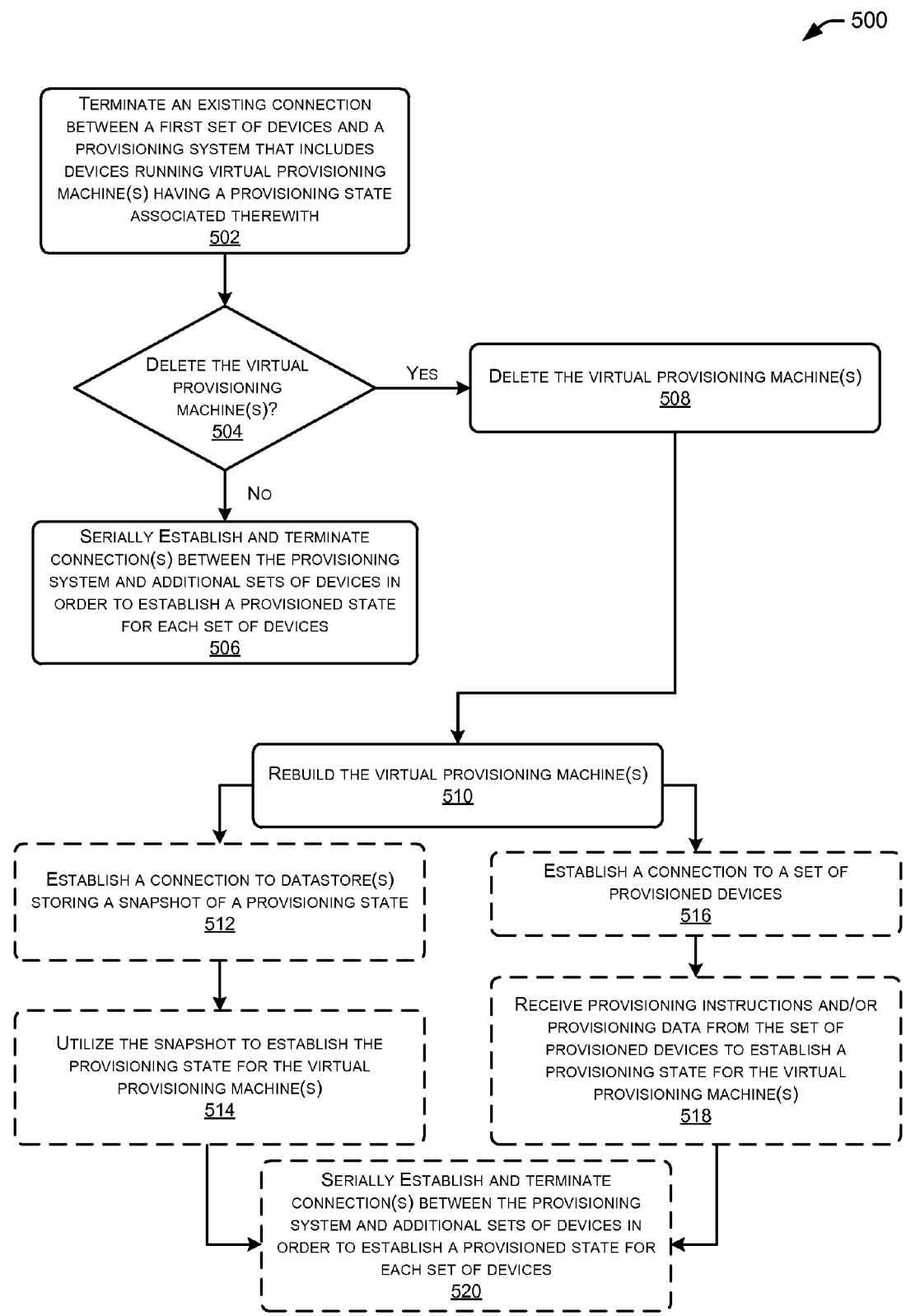
FIG. 5 depicts a flow diagram illustrating various functionality associated with a provisioning system in accordance with one or more embodiments of the disclosure.

FIG. 5 depicts a flow diagram of an illustrative method 500 of various interactions between a provisioning system comprising one or more virtual provisioning machines and various sets of devices in accordance with one or more embodiments of the disclosure. The method 500 depicted in FIG. 5 illustrates the disposable and re-usable characteristics of the virtual provisioning machines in accordance with one or more embodiments of the disclosure.

At block 502, an existing connection between a first set of devices and a provisioning system may be terminated. The provisioning system may include provisioning devices running virtual provisioning machines having a provisioning state associated therewith. According to various embodiments, the first set of devices may be a set of initially non-provisioned devices that have been provisioned based at least in part on the provisioning state associated with the virtual provisioning machines. According to other embodiments, the first set of devices may represent a set of provisioned devices from which the provisioning devices received provisioning instructions and/or provisioning data or datastore(s) storing a snapshot that may have been used to re-establish the provisioning state for the virtual provisioning machines.

At block 504, a determination may be made as to whether to delete the virtual provisioning machines. Deleting the virtual provisioning machines may include removing the provisioning instructions and the provisioning data stored in the provisioning devices. If it is determined at block 504 that the virtual provisioning machines are not to be deleted (e.g., the provisioning instructions and the provisioning data stored in the provisioning devices are not to be removed), the process flow may proceed to block 506 where connections between the provisioning system and additional sets of devices may be serially established and terminated in order to respectively provision each set of devices based at least in part on the provisioning state associated with the virtual provisioning machines. As used herein, the term "serially establish and terminate connections" may refer to terminating a connection prior to establishing a next connection such that the provisioning system is only connected to one set of devices at any given time.

On the other hand, if it is determined at block 504, that the virtual provisioning machines are to be deleted, the virtual provisioning machines may be deleted at block 508. Such a determination may be made, for example, if the virtual provisioning devices were corrupted during attempted provisioning of a set of initially non-provisioned devices associated with a facility connected to an open network (e.g., the first set of devices).

Upon deleting the virtual provisioning machines at block 508, the virtual provisioning machines may be rebuilt at block 510. From block 510, the process 500 may proceed through one of two optional process flows.

In a first optional process flow, the process may proceed from block 510 to block 512, in which a connection is established between the provisioning devices and one or more datastores storing a snapshot of a previous provisioning state of the virtual provisioning machines. The provisioning state to which the snapshot relates may correspond to the provisioning state associated with the virtual provisioning machines prior to their deletion or to a provisioning state associated with any previous instances of the virtual provisioning machines.

At optional block 514, the stored snapshot may be utilized to establish the provisioning state for the virtual provisioning machines. In various embodiments, the provisioning state associated with the virtual provisioning machines prior to their deletion may be re-established. Establishing the provisioning state may include receiving and storing in the memory of the provisioning devices that is allocated to the virtual provisioning machines provisioning instructions and/ or provisioning data included in the snapshot.

As previously noted, the process flow may optionally proceed from block 510 to block 516. After the virtual provisioning machines are rebuilt at block 510, a connection may be established between the provisioning devices and a set of provisioned devices at block 516. At optional block 518, the provisioning devices may receive from the set of provisioned devices provisioning instructions and/or provisioning data. The received provisioning instructions and/or provisioning data may be stored in portion(s) of memory allocated to the virtual provisioning machines and may be used to establish a provisioning state associated with the virtual provisioning machines.

At optional block 520, once the provisioning state has been established for the rebuilt virtual provisioning machines, either through the process flow including optional blocks 512 and 514 or the process flow including optional blocks 516 and 518, the provisioning system may establish serial connections with additional sets of devices and provision each set of devices based at least in part on the provisioning state associated with the virtual provisioning machines.

The exemplary method 500 depicted in FIG. 5 illustrates the manner in which virtual provisioning machines running on provisioning devices forming part of a provisioning system or provisioning environment may operate as a migrant set of provisioning devices capable of provisioning initially non-provisioned devices at various remote facilities. The exemplary method 500 also illustrates the disposable nature of the virtual provisioning machines in accordance with embodiments of the disclosure, as corrupted virtual provisioning machines can be deleted and rebuilt, and a provisioning state can be associated once again with the rebuilt virtual provisioning machines without exposing existing production environments to security threats that may potentially be posed by open networks associated with non-provisioned devices.

Embodiments of the disclosure may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A provisioning system, comprising:
a provisioning server comprising a virtual provisioning machine, wherein the provisioning server comprises:
at least one memory storing computer-executable instructions, and
at least one processor configured to access the at least one memory to execute the computer-executable instructions to:
establish a first connection between the provisioning server and a first remote device located remotely from the provisioning system,
receive from the first remote device and store in at least a portion of the at least one memory allocated to the virtual provisioning machine computer-executable provisioning instructions and provisioning data,
establish a temporary provisioning state of the virtual provisioning machine using the computer-executable provisioning instructions and the provisioning data,
terminate the first connection between the provisioning server and the first remote device,
establish a second connection between the provisioning server and a second remote device located remotely from the first remote device and from the provisioning system,
cause a provisioned state of the second remote device to be established using the temporary provisioning state of the virtual provisioning machine by, at least in part, executing a first portion of the computer-executable provisioning instructions to cause a second portion of the computer-executable provisioning instructions to be transmitted to the second remote device and executed by the second remote device to establish the provisioned state of the second remote device, and
transfer execution control to the second remote device to cause one or more additional remote devices to be provisioned based at least in part on the provisioned state of the second remote device.

2. The system of claim 1, wherein the provisioned state established for the second remote device comprises an operational configuration of the second remote device.

3. The system of claim 1, wherein the at least one processor is configured to cause the provisioned state of the second remote device to be established by executing the computer-executable instructions to:
- store a snapshot representative of the temporary provisioning state of the virtual provisioning machine in one or more storage devices, wherein the snapshot comprises the computer-executable provisioning instructions and the provisioning data;
- initiate establishment of the provisioned state of the second remote device based at least in part on the temporary provisioning state of the virtual provisioning machine;
- terminate the second connection between the provisioning server and the second remote device prior to establishment of the provisioned state of the second remote device;
- delete the virtual provisioning machine;
- rebuild the virtual provisioning machine, wherein rebuilding the virtual provisioning machine comprises re-establishing the temporary provisioning state of the virtual provisioning machine using the snapshot;
- establish a third connection between the provisioning device and the second remote device; and
- cause the provisioned state of the second remote device to be established using the re-established temporary provisioning state of the virtual provisioning machine.

4. The system of claim 2, wherein execution of the first portion of the computer-executable provisioning instructions further causes at least a portion of the provisioning data to be transmitted to the second remote device in order to establish the operational configuration of the second remote device.

5. The system of claim 4, wherein the at least one processor is further configured to access the at least one memory to execute the computer-executable instructions to:
- transmit the first portion of the computer-executable provisioning instructions to the second remote device,
- wherein transfer of the execution control to the second remote device causes the first portion of the computer-executable provisioning instructions transmitted to the second remote device to be executed to cause a third remote device of the one or more additional remote devices to receive at least one of: the second portion of the computer-executable provisioning instructions or the at least a portion of the provisioning data from the second remote device.

6. The system of claim 5, wherein an operational configuration of the third remote device is established based at least in part on the operational configuration of the second remote device.

7. A method, comprising:
- establishing a virtual provisioning machine on a provisioning device forming at least part of a provisioning system;
- establishing a first connection between the provisioning device and a first remote device located remotely from the provisioning system;
- receiving, by the provisioning device from the first remote device, computer-executable provisioning instructions and provisioning data;
- storing the computer-executable provisioning instructions and the provisioning data in memory allocated to the virtual provisioning machine;
- establishing, using the computer-executable provisioning instructions and the provisioning data, a temporary provisioning state of the virtual provisioning machine;
- terminating the first connection between the provisioning device and the first remote device;
- establishing a second connection between the provisioning device and a second remote device located remotely from the first remote device and the provisioning system;
- causing a provisioned state of the remote device to be established using the temporary provisioning state of the virtual provisioning machine by, at least in part, executing a first portion of the computer-executable provisioning instructions to cause a second portion of the computer-executable provisioning instructions to be transmitted to the second remote device and executed by the second remote device to establish the provisioned state of the second remote device; and
- transferring execution control to the remote device to cause one or more additional remote devices to be provisioned based at least in part on the provisioned state of the second remote device.

8. The method of claim 7, wherein causing the provisioned state of the remote device to be established further comprises:
- storing a snapshot representative of the temporary provisioning state of the virtual provisioning machine in one or more storage devices, wherein the snapshot comprises the computer-executable provisioning instructions and the provisioning data;
- initiating establishment of the provisioned state of the second remote device based at least in part on the temporary provisioning state of the virtual provisioning machine;
- terminating the second connection between the provisioning device and the second remote device prior to establishment of the provisioned state of the second remote device;
- deleting the virtual provisioning machine;
- rebuilding the virtual provisioning machine, wherein rebuilding the virtual provisioning machine comprises re-establishing the temporary provisioning state of the virtual provisioning machine using the snapshot;
- establishing a third connection between the provisioning device and the second remote device; and
- causing the provisioned state of the second remote device to be established using the re-established temporary provisioning state of the virtual provisioning machine.

9. The method of claim 7, wherein causing the provisioned state of the second remote device to be established further comprises:
- transmitting, to the second remote device, at least one of: the first portion of the computer-executable provisioning instructions or at least a portion of the provisioning data.

10. The method of claim 7, wherein the provisioned state of the second remote device corresponds to the temporary provisioning state of the virtual provisioning machine.

11. The method of claim 7, wherein the provisioned state of the second remote device comprises an operational configuration associated with the second remote device.

12. The method of claim 9, further comprising:
- terminating, by the provisioning system, the second connection between the provisioning device and the second remote device after the provisioned state of the second remote device is established,
- wherein, after termination of the second connection, the provisioned state of a third remote device of the one or more additional remote devices is established based at least in part on the provisioned state of the second remote device.

13. The method of claim 7, wherein an Internet Protocol (IP) address space allocated to the provisioning device differs from an IP address space allocated to the second remote device.

14. The method of claim 7, wherein at least one of the first connection or the second connection comprises a virtual private network connection.

15. The method of claim 7, wherein the provisioning system forms at least part of a service provider environment.

16. The method of claim 7, wherein the first remote device and the second remote device are each associated with a respective corresponding physical facility.

17. The method of claim 7, wherein the computer-executable provisioning instructions are first computer-executable provisioning instructions, the provisioning data is first provisioning data, the temporary provisioning state is a first temporary provisioning state, and the virtual provisioning machine is a first virtual provisioning machine, the method further comprising:
   terminating the second connection between the provisioning device and the second remote device prior to establishment of the provisioned state of the second remote device;
   deleting the first virtual provisioning machine;
   establishing a second virtual provisioning machine on the provisioning device; and
   establishing a second temporary provisioning state of the second virtual provisioning machine by:
      establishing a third connection between the provisioning device and the first remote device, and
      receiving, by the second virtual provisioning machine from the first remote device, second computer-executable provisioning instructions and second provisioning data.

18. One or more non-transitory computer-readable media comprising computer-executable instructions that, upon execution by one or more processors, configure the at least one processor to perform operations comprising:
   establishing a first connection between a provisioning device and a first remote device located remotely from the provisioning device;
   receiving, by the provisioning device from the first remote device, computer-executable provisioning instructions and provisioning data;
   storing the computer-executable provisioning instructions and the provisioning data in memory allocated to a virtual provisioning machine executing on the provisioning device;
   establishing, using the computer-executable provisioning instructions and the provisioning data, a temporary provisioning state of the virtual provisioning machine;
   terminating the first connection between the provisioning device and the first remote device;
   establishing a second connection between the provisioning device and a second remote device remotely located from the first remote device and the provisioning device;
   causing a provisioned state of the second remote device to be established using the temporary provisioning state of the virtual provisioning machine by, at least in part, executing a first portion of the computer-executable provisioning instructions to cause a second portion of the computer-executable provisioning instructions to be transmitted to the second remote device and executed by the second remote device to establish the provisioned state of the second remote device; and
   transferring execution control to the second remote device to cause one or more additional remote devices to be provisioned based at least in part on the provisioned state of the second remote device.

19. The one or more computer-readable media of claim 18, wherein causing the provisioned state of the second remote device to be established comprises restricting the second remote device from accessing at least a portion of information stored on the provisioning device.

20. The one or more non-transitory computer-readable media of claim 18, wherein establishing the provisioned state of the second remote device further comprises:
   storing a snapshot representative of the temporary provisioning state of the virtual provisioning machine in one or more storage devices, wherein the snapshot comprises the computer-executable provisioning instructions and the provisioning data;
   initiating establishment of the provisioned state of the second remote device based at least in part on the temporary provisioning state of the virtual provisioning machine;
   terminating the second connection between the provisioning device and the second remote device prior to establishing the provisioned state of the second remote device;
   deleting the virtual provisioning machine;
   rebuilding the virtual provisioning machine, wherein rebuilding the virtual provisioning machine comprises re-establishing the temporary provisioning state of the virtual provisioning machine using the snapshot;
   establishing a third connection between the provisioning device and the second remote device; and
   causing the provisioned state of the second remote device to be established using the re-established temporary provisioning state of the virtual provisioning machine.

21. The method of claim 7, wherein the provisioned state established for the second remote device comprises an operational configuration of the second remote device.

22. The method of claim 21, wherein execution of the first portion of the computer-executable provisioning instructions further causes at least a portion of the provisioning data to be transmitted to the second remote device in order to establish the operational configuration of the second remote device.

23. The method of claim 7, further comprising:
   transmitting the first portion of the computer-executable provisioning instructions to the second remote device, wherein transferring the execution control to the second remote device causes the first portion of the computer-executable provisioning instructions transmitted to the second remote device to be executed to cause a third remote device of the one or more additional remote devices to receive at least one of: the second portion of the computer-executable provisioning instructions or the at least a portion of the provisioning data from the second remote device.

24. The one or more non-transitory computer-readable media of claim 18, wherein the provisioned state established for the second remote device comprises an operational configuration of the second remote device.

25. The method of claim 24, wherein execution of the first portion of the computer-executable provisioning instructions further causes at least a portion of the provisioning data to be transmitted to the second remote device in order to establish the operational configuration of the second remote device.

26. The one or more non-transitory computer-readable media of claim 18, the operations further comprising:
   transmitting the first portion of the computer-executable provisioning instructions to the second remote device, wherein transferring the execution control to the second remote device causes the first portion of the computer-executable provisioning instructions transmitted to the second remote device to be executed to cause a third remote device of the one or more additional remote devices to receive at least one of: the second portion of the computer-executable provisioning instructions or the at least a portion of the provisioning data from the second remote device.

27. The one or more non-transitory computer-readable media of claim 18, wherein the provisioned state of the second remote device corresponds to the temporary provisioning state of the virtual provisioning machine.

28. The one or more non-transitory computer-readable media of claim 18, the operations further comprising:
   terminating the second connection between the provisioning device and the second remote device after the provisioned state of the second remote device is established,
   wherein, after termination of the second connection, the provisioned state of a third remote device of the one or more additional remote devices is established based at least in part on the provisioned state of the second remote device.

29. The one or more non-transitory computer-readable media of claim 18, wherein the first remote device and the second remote device are each associated with a respective corresponding physical facility.

\* \* \* \* \*